(12) United States Patent
Ogawa et al.

(10) Patent No.: US 6,556,569 B1
(45) Date of Patent: Apr. 29, 2003

(54) SYSTEM FOR MANAGING CONNECTION-ORIENTED COMMUNICATION INTERFACE WITH FLEXIBLE VIRTUAL CHANNEL ASSOCIATION

(75) Inventors: Jun Ogawa, Kawasaki (JP); Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/226,410

(22) Filed: Jan. 6, 1999

(30) Foreign Application Priority Data

Apr. 23, 1998 (JP) ............................................ 10-112987

(51) Int. Cl.[7] .............................................. H04L 12/56
(52) U.S. Cl. ...................... 370/395.2; 370/465; 370/463
(58) Field of Search ............................... 370/395.1, 397, 370/399, 390, 395.2, 395.3, 395.21, 395.31, 395.52, 395.53, 395.6, 400–409

(56) References Cited

U.S. PATENT DOCUMENTS

| | | | | | |
|---|---|---|---|---|---|
| 5,416,771 A | * | 5/1995 | Iwata | ......................... | 370/397 |
| 5,903,559 A | * | 5/1999 | Acharya et al. | ........ | 370/395.52 |
| 6,016,319 A | * | 1/2000 | Kshirsagar et al. | ......... | 370/399 |
| 6,144,661 A | * | 11/2000 | Katsube et al. | ............. | 370/390 |
| 6,222,842 B1 | * | 4/2001 | Sasyan et al. | .............. | 370/397 |
| 6,304,577 B1 | * | 10/2001 | Nagami et al. | .......... | 370/395.3 |

FOREIGN PATENT DOCUMENTS

| JP | 7-264207 | 3/1994 |
|---|---|---|
| JP | 8-274815 | 3/1995 |

* cited by examiner

Primary Examiner—Steven Nguyen
(74) Attorney, Agent, or Firm—Katten Muchin Zavis Rosenman

(57) ABSTRACT

A connection-oriented communication interface management system which permits a connection-oriented multiplexed communications network to fully enjoy the advantages of ATM technologies, by giving more flexibility to a link management mechanism that associates connection-oriented communication interfaces with virtual channels. The system comprises a virtual channel set-up unit and an interface set-up unit. The virtual channel set-up unit establishes a virtual channel to reach a peer (remote) node. Separately from this channel, the interface set-up unit establishes a connection-oriented communication interface to communicate with the peer node. At the same time, the interface set-up unit defines association between the established connection-oriented communication interface and the virtual channel established by the virtual channel set-up unit.

8 Claims, 14 Drawing Sheets

SYSTEM FOR MANAGING CONNECTION-ORIENTED COMMUNICATION INTERFACE WITH FLEXIBLE VIRTUAL CHANNEL ASSOCIATION

BACKGROUND OF THE INVENTION

1. Field of the Invention

The present invention relates to a connection-oriented communication interface management system, and more particularly to a connection-oriented communication interface management system implemented in a network node 10 which communicates with remote nodes over a multiplexed communications medium.

2. Description of the Related Art

According to a rapid proliferation of the Internet in today's business and research environments, the development of high-speed backbone networks taking advantage of Asynchronous Transfer Mode (ATM) technologies is of increased interest. ATM, however, does not have a direct compatibility with the classical protocols used in the Internet. To solve this issue, researchers participating in the Internet Engineering Task Force (IETF) have been investigating "IP Over ATM" protocols to connect the Internet Protocol (IP) layer directly to an ATM network.

Conventional IP nodes, such as a router to which a plurality of terminal stations are connected, are designed to use logical communication interfaces when transmitting IP packets to remote destinations over a physical network, including a local area network (LAN) and public switched telecommunications network (PSTN). To this end, there are two types of logical communication interfaces: network interface and point-to-point interface. In the network interface, some address resolution mechanisms have to be introduced, because it is not possible to uniquely identify the destination node from a given IP address alone. The Next Hop Resolution Protocol (NHRP) and Address Resolution Protocol (ARP) have been proposed and/or used for this purpose.

In contrast to the network interface, the point-to-point interface allows a unique ATM address and VPI/VCI to be determined from a given destination IP address, without the need of address resolution mechanisms. In conventional schemes, however, one point-to-point interface is established in association with one virtual channel in a fixed manner. That is, different point-to-point interfaces are provided for individual virtual channels, meaning that a possible failure in a virtual channel would render its associated point-to-point interface invalid.

ATM, which is a connection-oriented multiplexed communications technology, also uses a point-to-point interface established together with a virtual channel before initiating a communication session. As one of its inherent features, ATM can consolidate many signal streams into one physical channel with its multiplexing mechanism, which would potentially permit the network nodes to change the relationship between a point-to-point interface and a virtual channel as required. In spite of this advantageous capability of ATM, conventional network systems provide only a limited flexibility in the association between point-to-point interfaces and virtual channels. This means that the potential advantage of ATM has been overlooked in the conventional system design.

SUMMARY OF THE INVENTION

Taking the above into consideration, an object of the present invention is to provide a connection-oriented communication interface management system which permits a connection-oriented multiplexed communications network to fully enjoy the advantages of ATM technologies, by giving more flexibility to a link management mechanism that associates connection-oriented communication interfaces with virtual channels.

To accomplish the above object, according to the present invention, there is provided a connection-oriented communication interface management system disposed in a node which communicates with peer nodes by using multiplexed communications techniques. This system comprises a virtual channel set-up unit which establishes a virtual channel to a peer node and an interface set-up unit which establishes a connection-oriented communication interface to reach the peer node and associates the connection-oriented communication interface with the virtual channel established by the virtual channel set-up unit.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENTS

An embodiment of the present invention will be described below with reference to the accompanying drawings.

Figure 1:
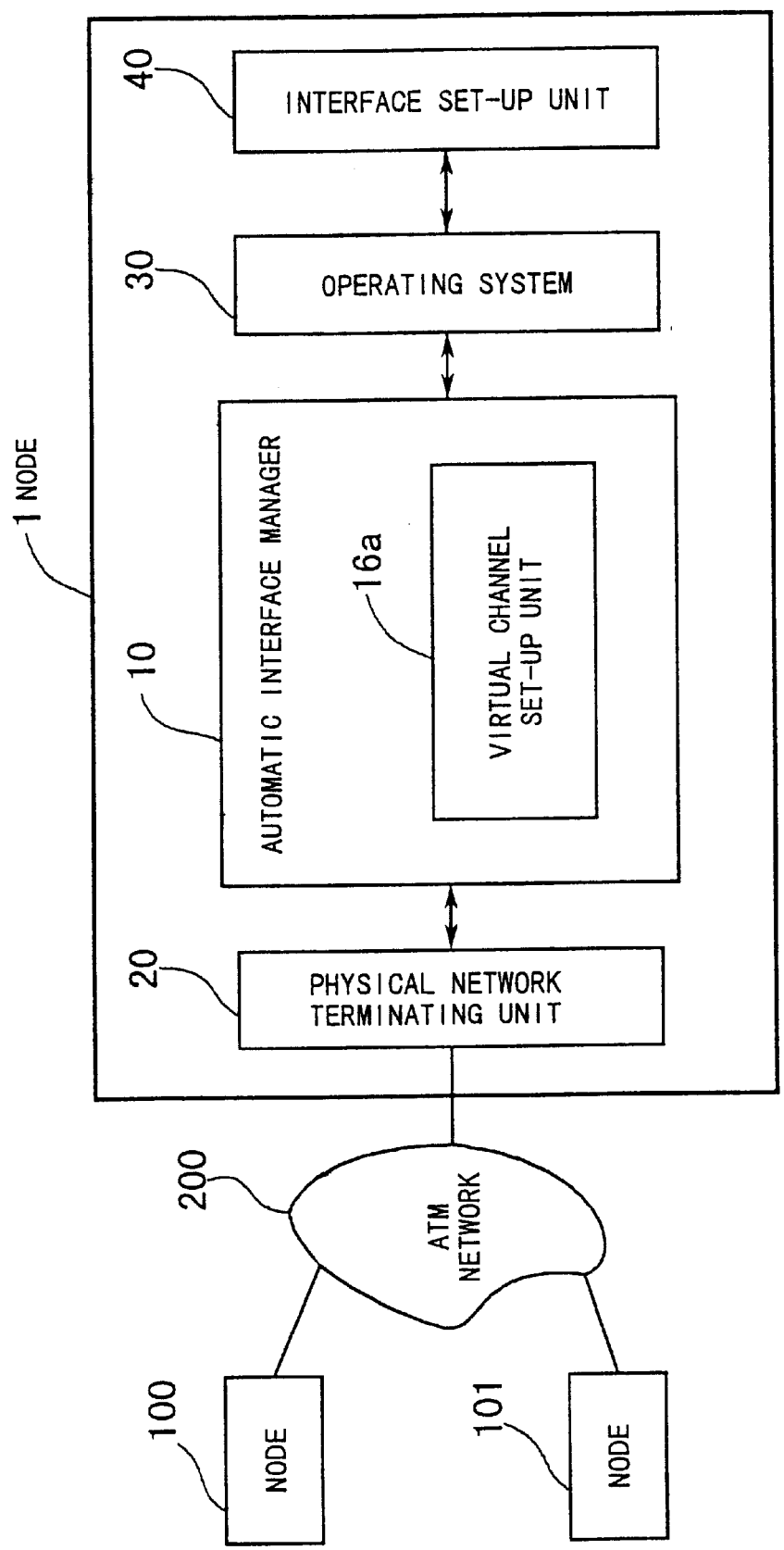
FIG. 1 is a conceptual view of the present invention.

Referring first to FIG. 1, the following section will describe the concept of a node in which a connection oriented communication interface management system of the present invention is implemented. The proposed system is incorporated in nodes 1, 100, and 101, which communicate with each other over an ATM network 200. More specifically, FIG. 1 shows that the node 1 comprises an automatic interface manager 10, a physical network terminating unit 20, an operating system (OS) 30, and an interface set-up unit 40. Under the operating system 30, the automatic interface manager 10 controls network communication, including packet/cell conversion and virtual channel management, in conjunction with the physical network terminating unit 20, which actually transmits and receives ATM cells. Serving as part of the automatic interface manager 10, a virtual channel set-up unit 16a establishes a virtual channel to link the node 1 with a peer (remote) node. The interface set-up unit 40 establishes a connection-oriented communication interface to reach the peer node and associates that connection-oriented communication interface with the virtual channel established by the virtual channel set-up unit 16a. The details of each component shown in FIG. 1 will be presented later with reference to FIG. 3.

In the above-described configuration, the virtual channel set-up unit 16a establishes a virtual channel extending to a peer node. Independently of this channel, the interface set-up unit 40 establishes a connection-oriented communication interface to reach the peer node. At the same time, the interface set-up unit 40 defines association between the established connection-oriented communication interface and the virtual channel established by the virtual channel set-up unit 16a.

The nodes equipped with an interface management system having the above capabilities execute packet communication by using virtual channels and their associated connection-oriented communication interfaces. If any error occurs in a virtual channel, the corresponding connection-oriented communication interface will be dissociated from the failed virtual channel, and newly associated with another virtual channel. In this way, the present invention makes it possible to associate a connection-oriented communication interface with a virtual channel as required in a connection-oriented multiplexed communications system. Accordingly, the increased flexibility will be provided in communications network design, and it will be possible to construct an advanced communications network, fully taking advantage of ATM technologies.

The preferred embodiment of the present invention outlined above will now be described in more detail below.

Figure 2:
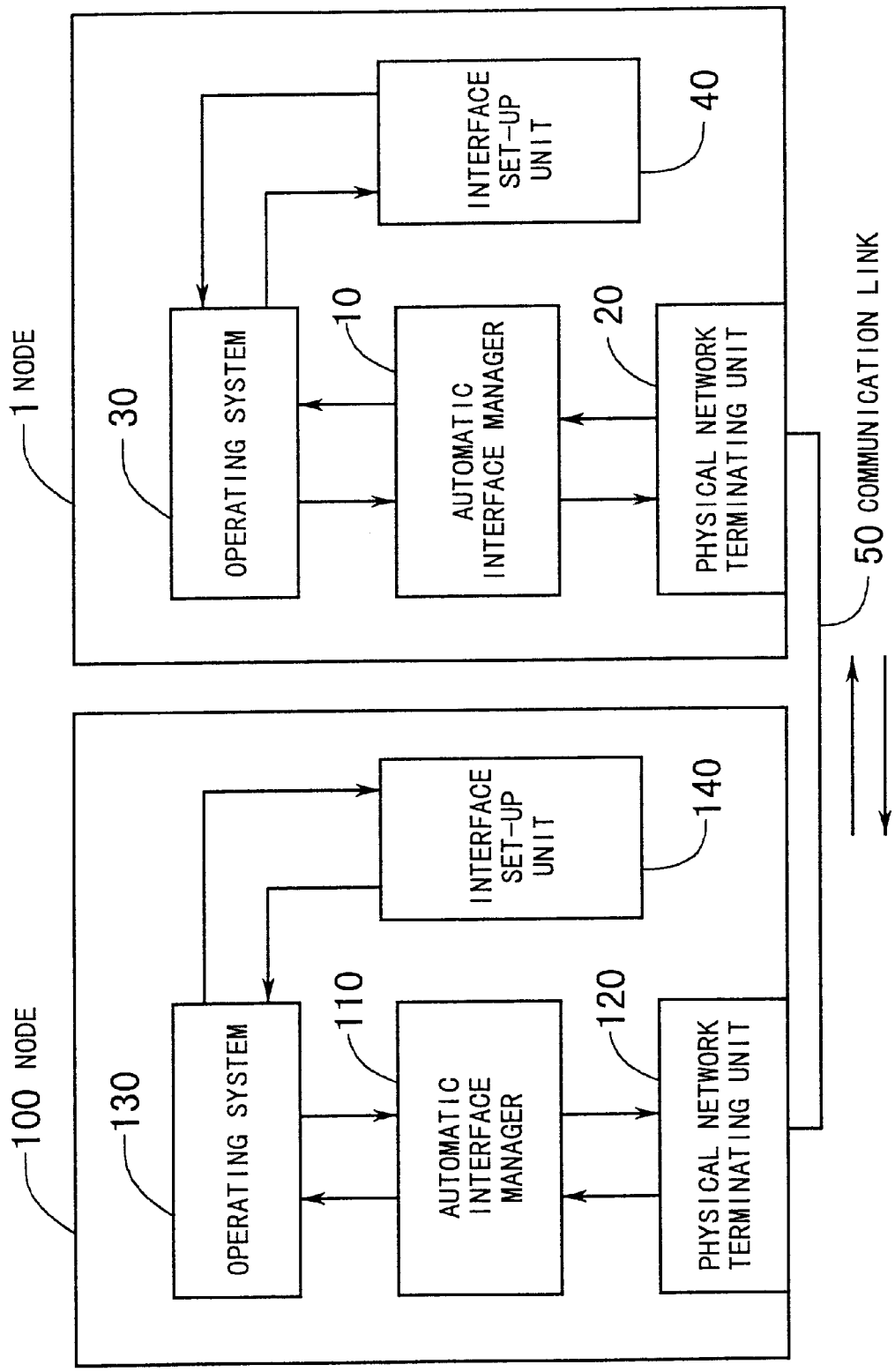
FIG. 2 is a diagram which shows a couple of nodes connected by a point-to-point communication channel.

FIG. 2 shows a couple of nodes 1 and 100 interconnected by a point-to-point communication link 50. In the present embodiment, the nodes 1 and 100 are small-scale computers, which execute multiple tasks, using the communication link 50 to communicate with each other. More specifically, the communication link 50 contains a plurality of virtual channels which are assigned to different tasks, allowing each node to appear to be a plurality of terminal stations running independently of each other. Since the two nodes 1 and 100 have a common internal structure, the following explanation will concentrate on the node 1. While being illustrated as stand-alone equipment in the accompanying drawings, the nodes 1 and 100 may actually be routers that handle messages to/from their local terminal stations.

As mentioned earlier in FIG. 1, the node 1 comprises an automatic interface manager 10, a physical network terminating unit 20, an operating system 30, and an interface set-up unit 40. In actuality, those blocks are realized as software functions of a small-scale computer that serves as the node 1. The node 1 is connected to the peer node 100 via the physical network terminating unit 20, which terminates ATM cells sent over the communication link 50 according to the physical layer specifications of ATM. The automatic interface manager 10 performs the following tasks: ATM cell assembly and disassembly (i.e., packet/cell conversion), set-up and disconnection of virtual channels (VCs), request for establishment and release of point-to-point interfaces, etc. These functions will be described later in more detail, with reference to FIG. 3. It should be noted here that the automatic interface manager 10 can be embodied as integral part of the operating system 30, although FIG. 2 illustrates them as separate functional units in the node 1.

The operating system 30 sends and receives packets and carries out their associated tasks. It further serves as an intermediary point for request/response messaging, which occurs when the automatic interface manager 10 interacts with the interface set-up unit 40 to establish or release a point-to-point interface. When a message that requests establishment of a point-to-point interface for a specific task is received, the interface set-up unit 40 calls a point-to-point communication software program (now illustrated) to make a necessary initial setup (i.e., allocation of necessary resources) for the task, thereby establishing a point-to-point interface for the task. The interface set-up unit 40 defines association between the established point-to-point interface and a virtual channel, and then it saves a record of that association being defined. Subsequently, it generates a response message to indicate that a series of requested processes have successfully finished. This message is transmitted to the automatic interface manager 10 by way of the operating system 30.

When a message requesting the release of a particular point-to-point interface is received, the interface set-up unit 40 calls the point-to-point communication software program to remove the initial setup (i.e., release the resources being allocated) of a relevant task. This releases the existing point-to-point interface that is relevant to the task. The interface set-up unit 40 further erases the record of the association between the released point-to-point interface and its corresponding virtual channel. Subsequently, it generates a response message to indicate that all requested processes have successfully finished. This message is delivered to the automatic interface manager 10 by way of the operating system 30. Note here that this interface set-up unit 40 can also be implemented as integral part of the operating system 30, although FIG. 2 illustrates it as an independent entity in the node 1.

Figure 3:
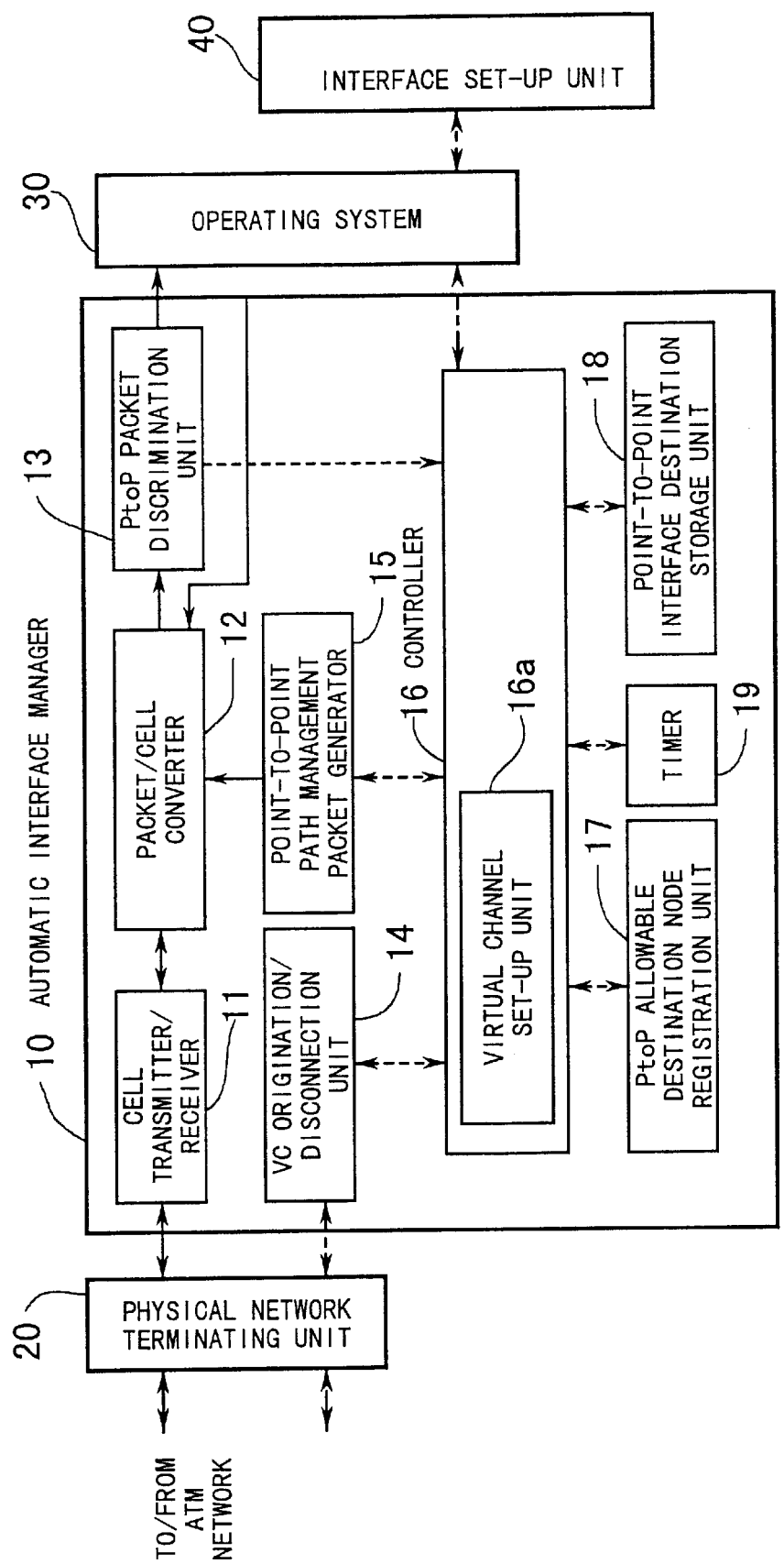
FIG. 3 is a diagram which shows the internal structure of an automatic interface manager.

FIG. 3 shows the internal structure of the automatic interface manager 10. In this FIG. 3, solid arrows show the flow of ATM cells and packets, while broken arrows show the flow of control signals.

The automatic interface manager 10 has a cell transmitter/receiver 11 which transmits ATM cells over the physical network medium via a physical network terminating unit 20. It also receives incoming ATM cells through the same path. A virtual channel (VC) origination/disconnection unit 14 originates a call to configure a virtual channel and disconnects the call to remove the virtual channel, according to instructions from a controller 16. The VC origination/disconnection unit 14 holds a virtual channel directory which stores the ATM addresses of destination nodes of existing virtual channels. A packet/cell converter 12 receives ATM cells from a cell transmitter/receiver 11, converts them into a packet, and sends the packet to a packet discrimination unit 13. Moreover, the packet/cell converter 12 receives a packet from a point-to-point path management packet generator 15 and/or the operating system 30, converts it into ATM cells, and sends them to the cell transmitter/receiver 11. A packet discrimination unit 13 tests whether the packet received from the packet/cell converter 12 falls into the category of point-to-point path management packets or the category of ordinary IP packets. The received packet is sent to the controller 16 if it is of the former kind. If it is of the latter kind, the message is sent to the operating system 30. Point-to-point path management packets refer to such packets that carry a request/response message to establish or release a point-to-point interface.

The point-to-point path management packet generator 15 produces a point-to-point path management packet according to instructions from the controller 16, and sends it to the packet/cell converter 12. The operator of this system should specify, in advance, a group of nodes which can be specified as the destination of a point-to-point interface. An allowable destination node registration unit 17 stores a directory of such potential destination nodes. When a point-to-point interface set-up request is received, the controller 16 consults the allowable destination node registration unit 17 to determine whether to accept the request or not, before starting a process to set up a point-to-point interface.

A point-to-point interface destination storage unit 18 stores a directory of destination nodes of all point-to-point interfaces that have been established at the node 1. More specifically, this directory contains each destination node's IP address and ATM address, together with a time record that indicates the time of the last access to the point-to-point interface concerned. When a point-to-point interface set-up request is received from a peer node, the controller 16 does not immediately start a process of interface establishment, but consults the directory in the point-to-point interface destination storage unit 18 to examine whether the requesting peer node is registered in the directory. If it is found that the requested interface already exists, the controller 16 will not accept the request.

A timer 19 produces an interrupt to the controller 16 at regular intervals. The controller 16 responds to each interrupt signal by examining the last-access time records stored in the point-to-point interface destination storage unit 18. There may exist a point-to-point interface whose time record shows that a predetermined time period has elapsed since its last access. If this is the case, the controller 16 deems that particular point-to-point interface obsolete, thus removing its entry from the directory.

While the main role of the controller 16 is to manage the processes to set up and/or remove point-to-point interfaces destined for peer nodes, it also supports the establishment and disconnection of virtual channels. The detailed operation of this controller 16 will be described below, with reference to FIGS. 4 to 14.

Now, the following section will describe how to set up and release a point-to-point path. Here, the term "path" refers to a combination of a point-to-point interface and its associated virtual channel.

Figure 4:
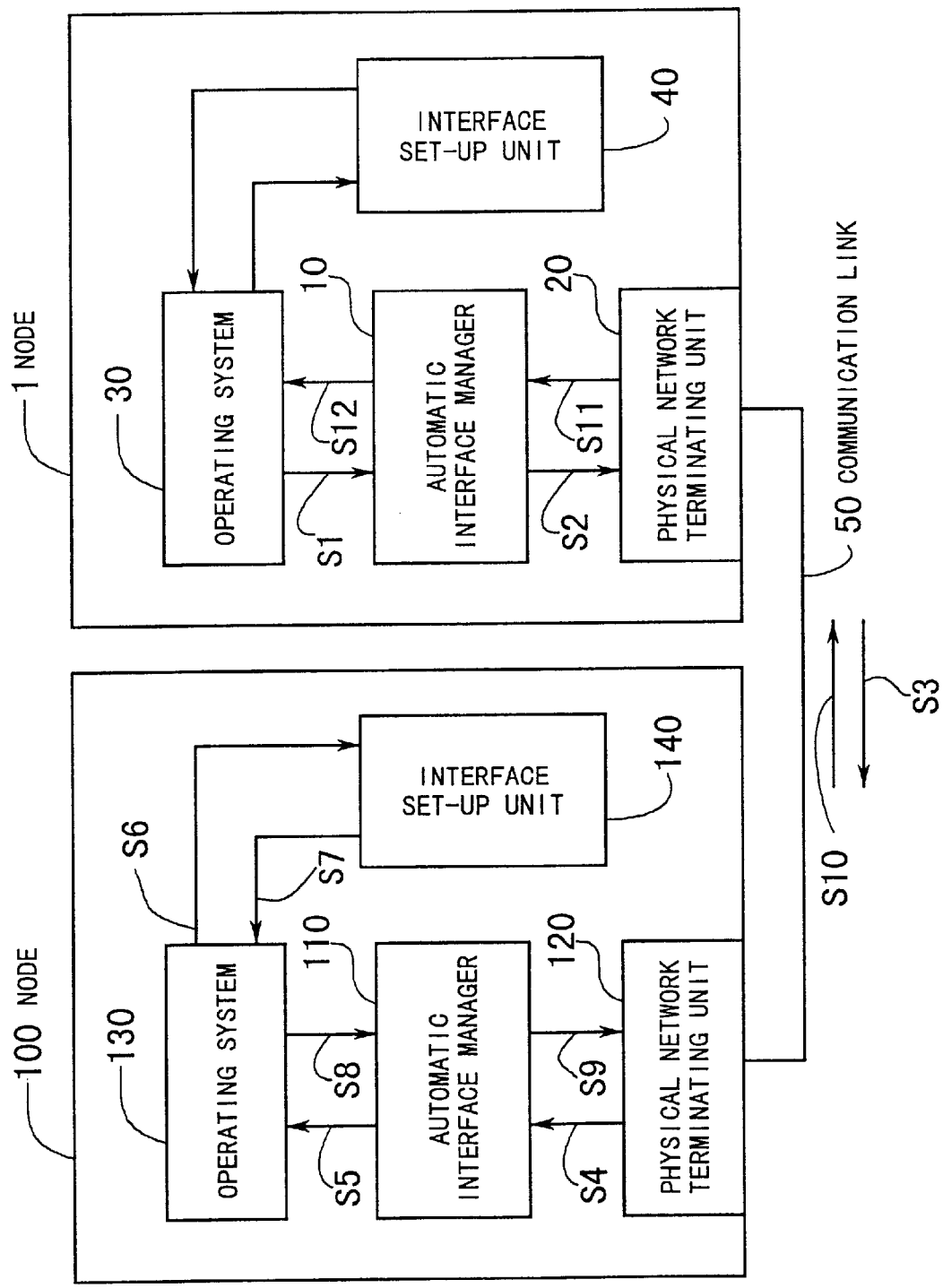
FIG. 4 is a diagram which shows a process to set up a point-to-point path between two nodes.

FIG. 4 shows a process to set up a point-to-point path between two nodes 1 and 100. The following explanation presents the details of this process, referring to the step numbers (S1 to S11) shown in FIG. 4.

It is assumed here that the nodes 1 and 100 have each been assigned an IP address (or logical address) and an ATM address (or physical address), and that an operator has entered a path set-up command to the node 1.

In response to the operator's command, the operating system 30 directs the controller 16 in the automatic interface manager 10 to establish a point-to-point path to the node 100, notifying the controller 16 of the physical address of the destination (Step S1). The controller 16 searches the point-to-point interface destination storage unit 18 to investigate whether the node 100 is registered as one of the destinations of existing point-to-point interfaces. If a relevant record is found, the controller 16 informs the operating system 30 that the requested point-to-point interface has already been established, and thus terminates the process. If, on the other hand, there is no relevant record in the point-to-point interface destination storage unit 18, the controller 16 sends a query to the VC origination/disconnection unit 14 as to whether the node 1 has a virtual channel reaching the peer node 100. If there is no such virtual channel established, the controller 16 requests the VC origination/disconnection unit 14 to initiate a call to the node 100. In response to this request, the VC origination/disconnection unit 14 attempts to set up a virtual channel to reach the remote node 100 and reports the result of that attempt.

Figure 5:
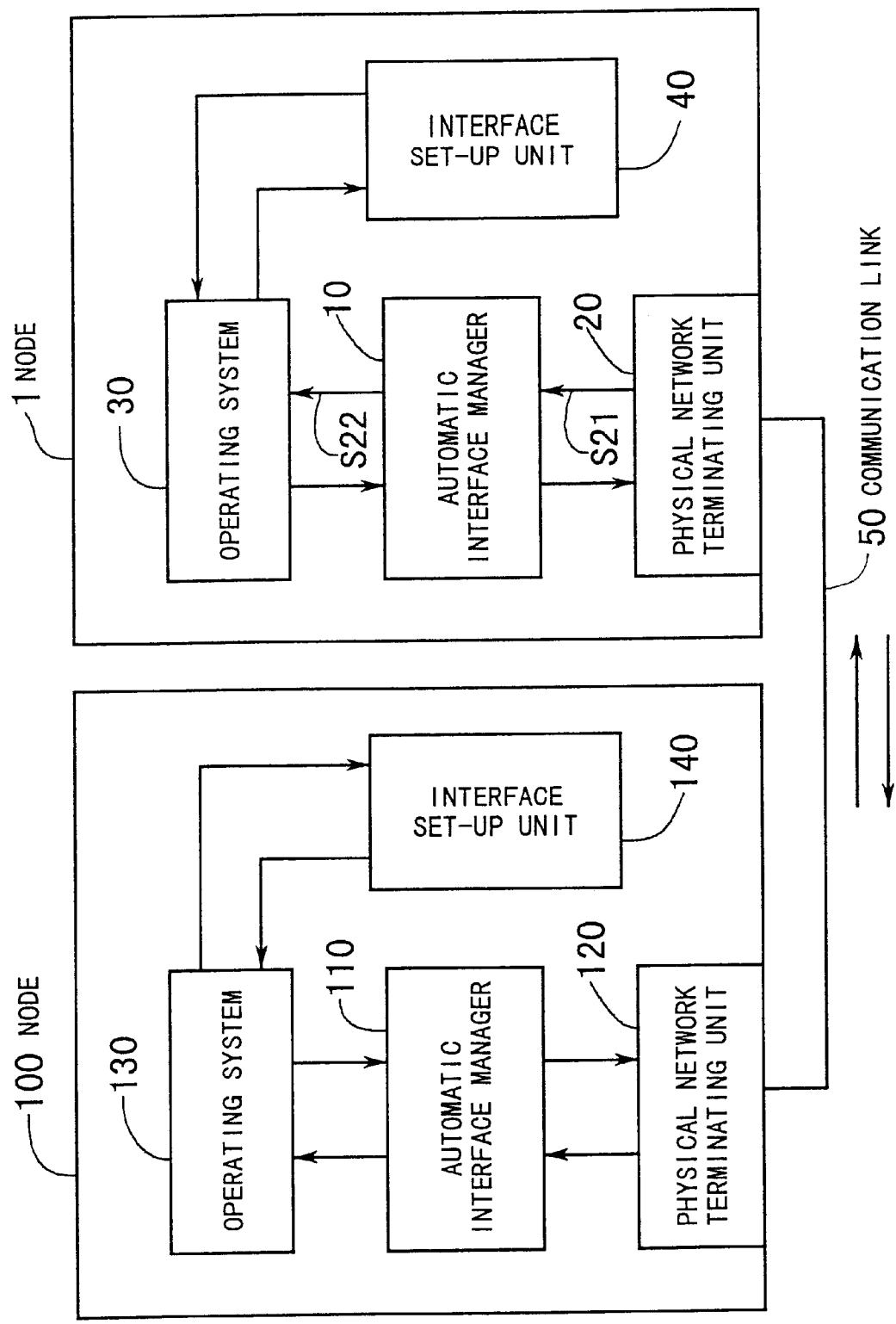
FIG. 5 is a diagram which shows a point-to-point path set-up process in which a virtual channel VC cannot be established.

When the requested virtual channel cannot be established, the process of FIG. 5 will be executed. Referring to FIG. 5, the physical network terminating unit in the node 1 notifies the automatic interface manager 10 of the unsuccessful results (Step S21). The controller 16 in the automatic interface manager 10 forwards the information to the operating system 30 (Step S22), thus terminating the present path set-up process.

Referring back to FIG. 4, when the requested virtual channel has been successfully established, the controller 16 in the automatic interface manager 10 directs the point-to-point path management packet generator 15 to produce and send out a packet containing a point-to-point interface set-up request message. The packet produced as such is passed to the physical network terminating unit 20 through the packet/cell converter 12 and cell transmitter/receiver 11 (Step S2). The packet is then transmitted toward the node 100, in the form of ATM cells (Step S3).

The point-to-point interface set-up request message having arrived at the node 100 is supplied from the physical network terminating unit 120 to the automatic interface manager 110 (Step S4). The subsequent process steps involve several functional units in the automatic interface manager 110. The following section will use the symbols and reference numerals shown in FIG. 3 to describe the automatic interface manager 110, because it has the same internal structure as the automatic interface manager 10.

Now, in the automatic interface manager 110, the point-to-point path set-up request message reaches the packet discrimination unit 13 via the cell transmitter/receiver 11 and packet/cell converter 12. The packet discrimination unit 13 forwards the message to the controller 16 to check whether the destination address of the message coincides with the address of the node 100 itself.

Figure 6:
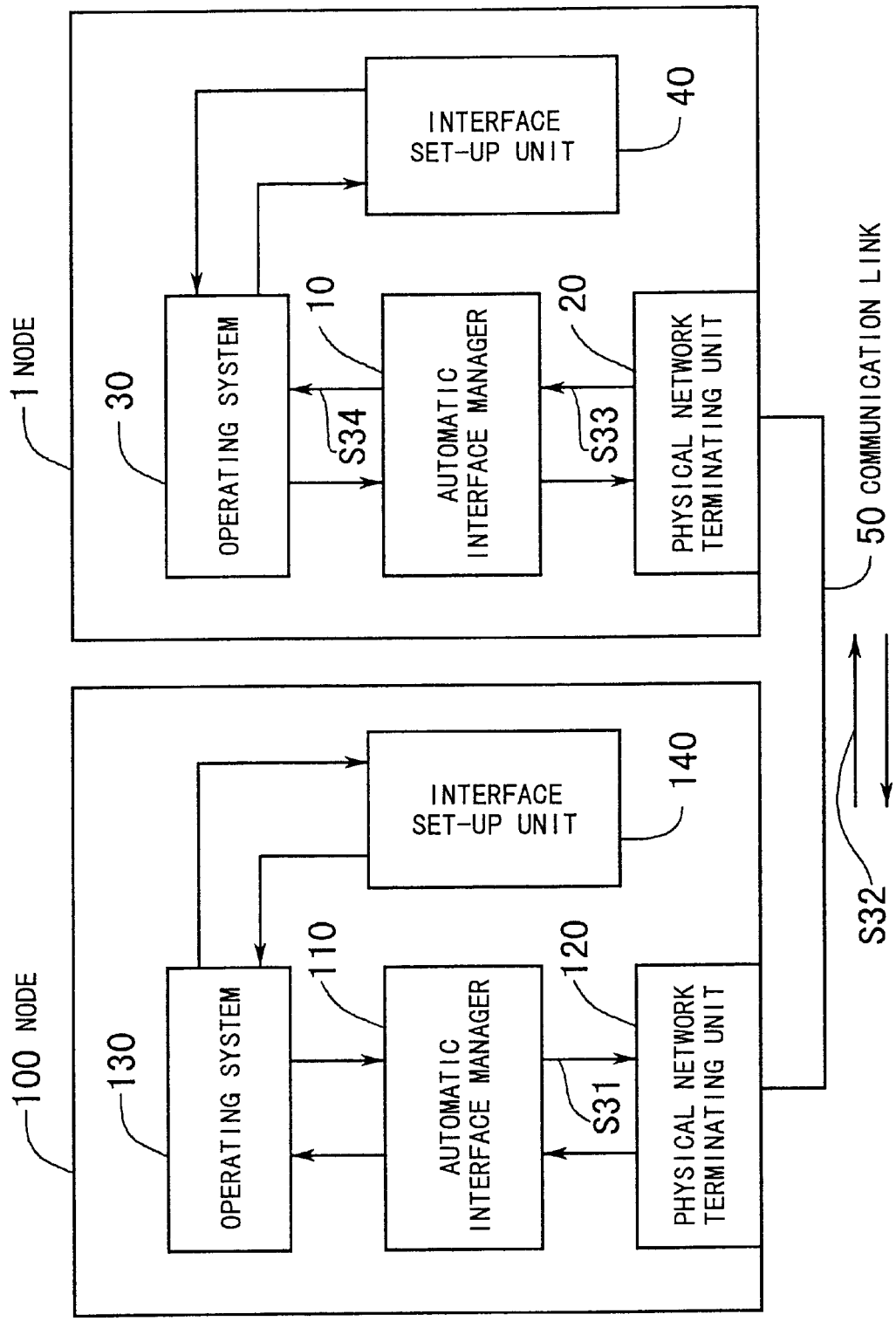
FIG. 6 is a diagram which shows a point-to-point path set-up process when the destination address of a point-to-point interface set-up request message is irrelevant.

If it turns out that the destination address of the request message does not agree with the node 100's address, then the present process proceeds to step S31 of FIG. 6. Referring now to FIG. 6, the controller 16 in the automatic interface manager 110 directs the point-to-point path management packet generator 15 to produce a packet containing a response message that indicates a destination address error. The produced packet is passed to the physical network terminating unit 120 through the packet/cell converter 12 and cell transmitter/receiver 11 in the automatic interface manager 110 (Step S31). The physical network terminating unit 120 transmits the response message back to the node 1 over the communication link 50 (Step S32).

At the node 1, the response message received by the physical network terminating unit 20 is delivered to the automatic interface manager 10 (Step S33). In the automatic interface manager 10, the received message reaches the packet discrimination unit 13 via the cell transmitter/receiver 11 and packet/cell converter 12, and the packet discrimination unit 13 forwards the message to the controller 16. Besides disconnecting a virtual channel relevant to the response message, the controller 16 notifies the operating system 30 of the destination address error (Step S34), thus terminating the point-to-point path set-up process.

Referring back to FIG. 4, when the destination address of the point-to-point interface request message coincides with the node 100's address, the controller 16 in the automatic interface manager 110 searches the directory stored in the allowable destination node registration unit 17. As mentioned earlier, the operator has specified beforehand a group of nodes which can be a destination of a point-to-point interface, and that information has been stored in the allowable destination node registration unit 17 in the automatic interface manager 110.

Figure 7:
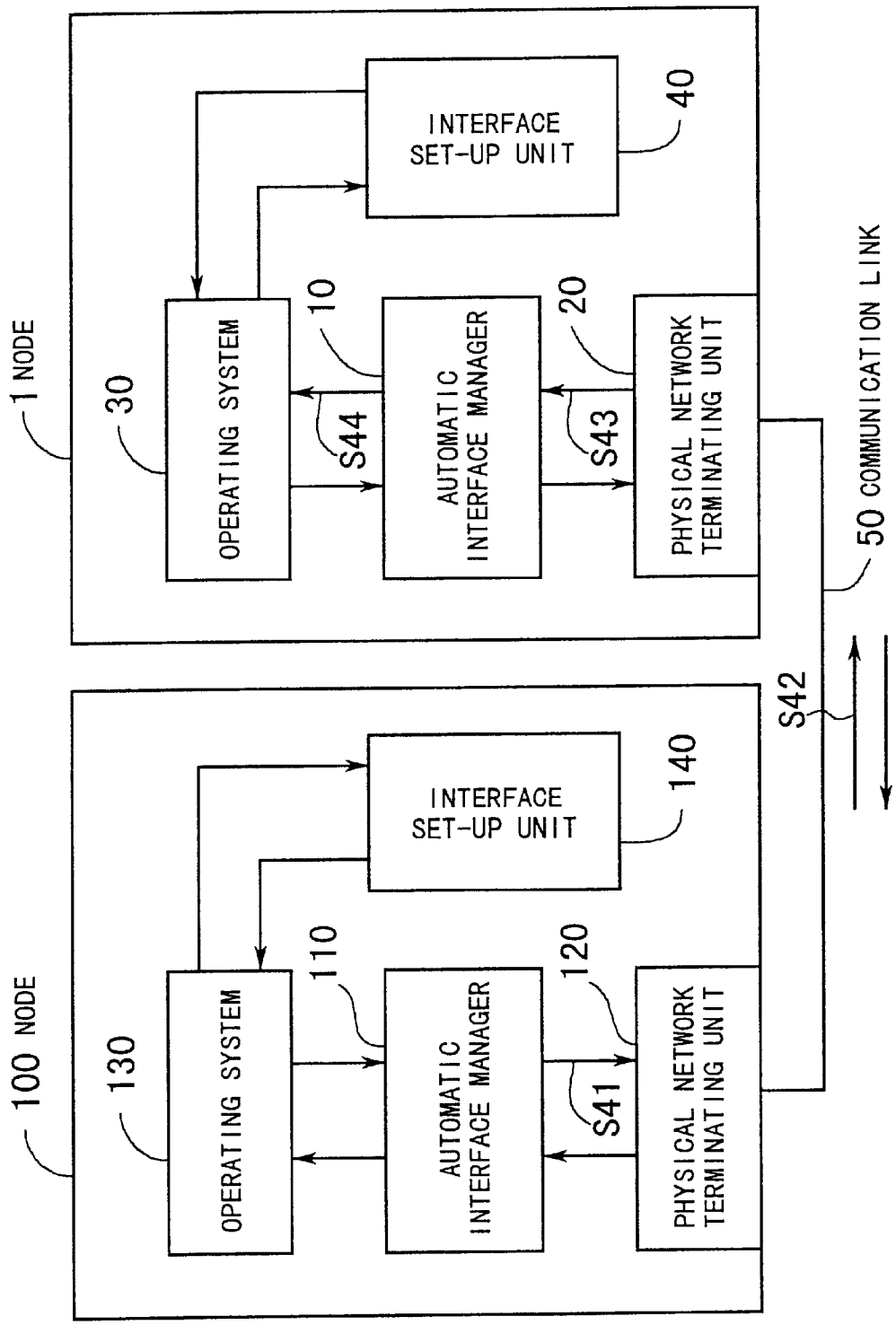
FIG. 7 is a diagram which shows a point-to-point path set-up process when the intended peer node is not registered in an allowable destination node registration unit.

If it turns out that the node 1 is not registered in the allowable destination node registration unit 17 as an eligible destination node, then the present process proceeds to step S41 of FIG. 7. Referring now to FIG. 7, the controller 16 in the automatic interface manager 110 directs the point-to-point path management packet generator 15 to produce a packet of a response message that directs not to establish the requested point-to-point path. The produced packet is then passed to the physical network terminating unit 120 through the packet/cell converter 12 and cell transmitter/receiver 11 in the automatic interface manager 110 (Step S41). The physical network terminating unit 120 transmits the response message to the node 1 over the communication link 50 (Step S42).

At the node 1, the response message received by the physical network terminating unit 20 is supplied to the automatic interface manager 10 (Step S43). In the automatic interface manager 10, the received message reaches the packet discrimination unit 13 via the cell transmitter/receiver 11 and packet/cell converter 12, and the packet discrimination unit 13 forwards the message to the controller 16. The controller 16 disconnects a virtual channel relevant to the response message, and then notifies the operating system 30 of the destination address error (Step S44), thus terminating the point-to-point path set-up process.

Referring back to FIG. 4, if the node 1 is registered in the allowable destination node registration unit 17 as an eligible destination node, the controller 16 in the automatic interface manager 110 commands the operating system 130 to set up a point-to-point interface and associate it with a virtual channel (Step S5). The operating system 130 informs the interface set-up unit 140 of this command (Step S6). Accordingly, the interface set-up unit 140 establishes a point-to-point interface to the node 1. That is, the interface set-up unit 140 establishes a new point-to-point interface for a specific task by calling a point-to-point communication software program to make a necessary initial setup for the task, thereby establishing a point-to-point interface at the peer node 100. Then the interface set-up unit 140 defines association between the established point-to-point interface and an existing virtual channel to the node 1. The interface set-up unit 140 saves a record of this association into its own storage. After that, the interface set-up unit 140 sends a report to the operating system 130 as to whether the requested processes have successfully finished (Step S7). The operating system 130 delivers this report to the automatic interface manager 110 (Step S8).

Figure 8:
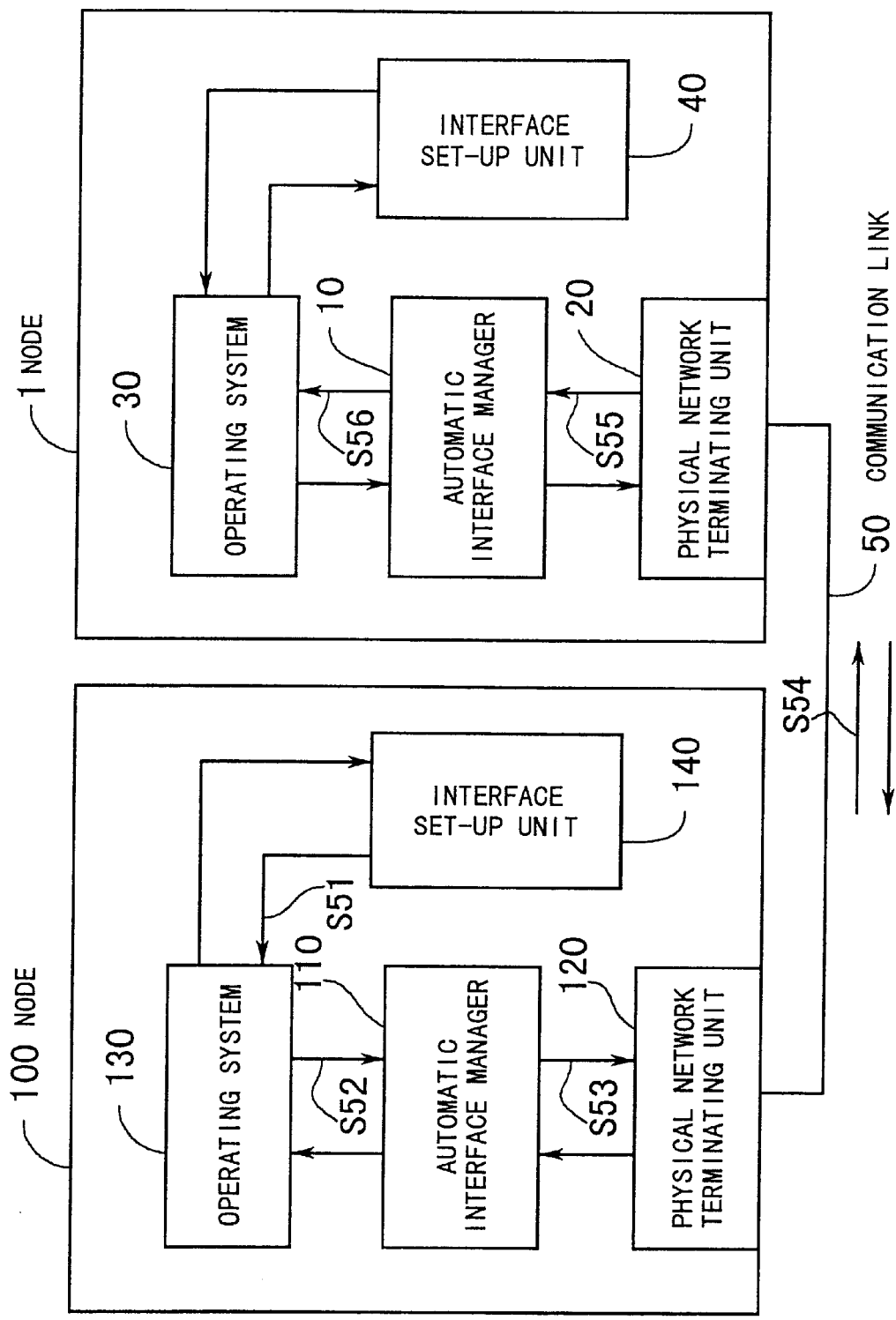
FIG. 8 is a diagram which shows a point-to-point path set-up process when either point-to-point interface setup or association with a virtual channel VC has failed.

When the point-to-point interface cannot be set up, or when the association between a point-to-point interface and a virtual channel cannot be defined, the point-to-point path set-up process proceeds to step S51 of FIG. 8. In the process of FIG. 8, the interface set-up unit 140 notifies the operating system 130 that it has failed to set up the requested point-to-point interface or the association with a virtual channel (Step S51). The operating system 130 forwards this notification message to the automatic interface manager 110 (Step S52).

In response to this notification message, the controller 16 in the automatic interface manager 110 directs the point-to-point path management packet generator 15 to produce a packet containing a response message that indicates the node's inability to set up a point-to-point interface or to define the association between a point-to-point interface and a virtual channel. The packet produced in this way is passed to the physical network terminating unit 120 through the packet/cell converter 12 and cell transmitter/receiver 11 in the automatic interface manager 110 (Step S53). The physical network terminating unit 120 transmits the response message to the node 1 over the communication link 50 (Step S54).

At the node 1, the physical network terminating unit 20 receives the response message and supplies it to the automatic interface manager 10 (Step S55). In the automatic interface manager 10, the received response message reaches the packet discrimination unit 13 via the cell transmitter/receiver 11 and packet/cell converter 12. The packet discrimination unit 13 forwards the message to the controller 16. The controller 16 disconnects a virtual channel relevant to the response message, and then notifies the operating system 30 of the abnormal end (Step S56), thus terminating the point-to-point path set-up process.

Referring again to FIG. 4, when the requested point-to-point interface is established and it is successfully associated with a virtual channel, the controller 16 in the automatic interface manager 110 commands the point-to-point interface destination storage unit 18 to register the IP address and ATM address of the node 1. The controller 16 then directs the point-to-point path management packet generator 15 to produce and send a packet containing a response message that indicates the successful results of both point-to-point interface set-up and virtual channel association. This response message is passed to the physical network terminating unit 120 through the packet/cell converter 12 and cell transmitter/receiver 11 in the automatic interface manager 110 (Step S9). The physical network terminating unit 120 transmits the response message to the node 1 over the communication link 50 (Step S10).

At the node 1, the physical network terminating unit 20 receives the response message and supplies it to the automatic interface manager 10 (Step S11). In the automatic interface manager 10, the received response message reaches the packet discrimination unit 13 via the cell transmitter/receiver 11 and packet/cell converter 12. The packet discrimination unit 13 forwards the message to the controller 16. From the received message, the controller 16 recognizes that the requested point-to-point interface has successfully established, together with its association with a virtual channel. It then reports this final result status to the operating system 30 (Step S12).

In this way, the peer node 100 has established a point-to-point interface to the node 1. It is now necessary for the node 1 to set up a point-to-point interface to reach the peer node 100. The first step for this is executed by the automatic interface manager 110 in the node 100, where the controller 16 requests its local point-to-point path management packet generator 15 to produce and send a packet for a point-to-point interface set-up request message to the node 1. The nodes 1 and 100 will execute subsequent steps just in the same way as described in steps S2 to S12, while the roles of the nodes 1 and 100 should be swapped.

Finally, the requested point-to-point interface is established at the both endpoints, nodes 1 and 100, together with its associated virtual channel. This means that a complete point-to-point path between the nodes 1 and 100 has become ready.

Now, the following section will describe how to release a point-to-point path.

Figure 9:
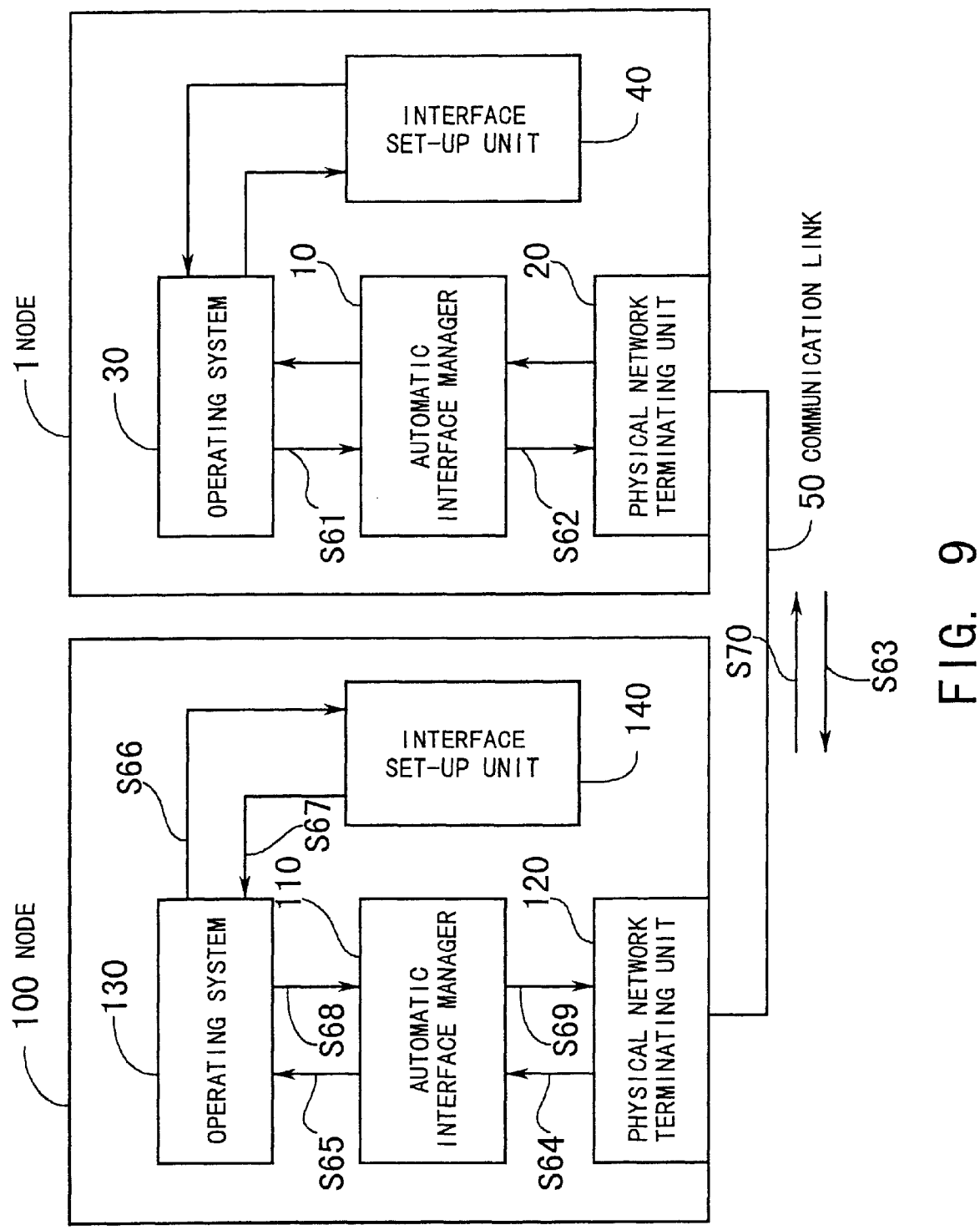
FIGS. 9 and 10 are diagrams which show the first and second halves of a process to release a point-to-point path between two nodes.
Figure 10:
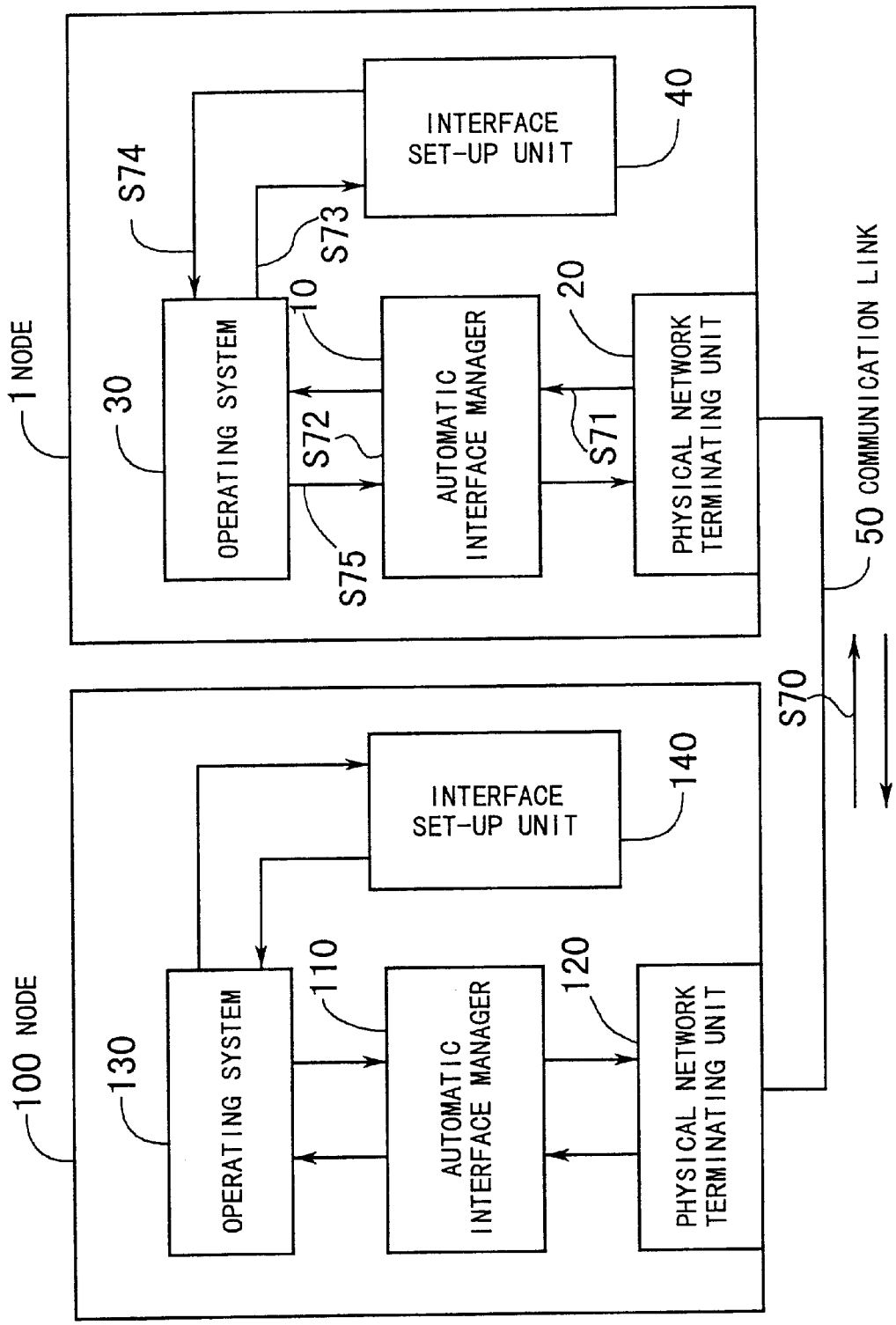

FIGS. 9 and 10 show the first and second halves of a process to release a point-to-point path between the node 1 and node 100. The following explanation presents the details of this process, citing the step numbers (S61 to S75) shown in FIGS. 9 and 10.

It is assumed here that an operator has entered a command to the node 1 to release a particular point-to-point path interconnecting the node 1 and node 100. In response to this operator's command, the operating system directs the controller 16 in the automatic interface manager 10 to release the existing point-to-point path to the node 100 (Step S61). The controller 16 then searches the point-to-point interface destination storage unit 18 to examine whether the node 100 is registered as one of the destinations of point-to-point interfaces that have already been established.

Figure 11:
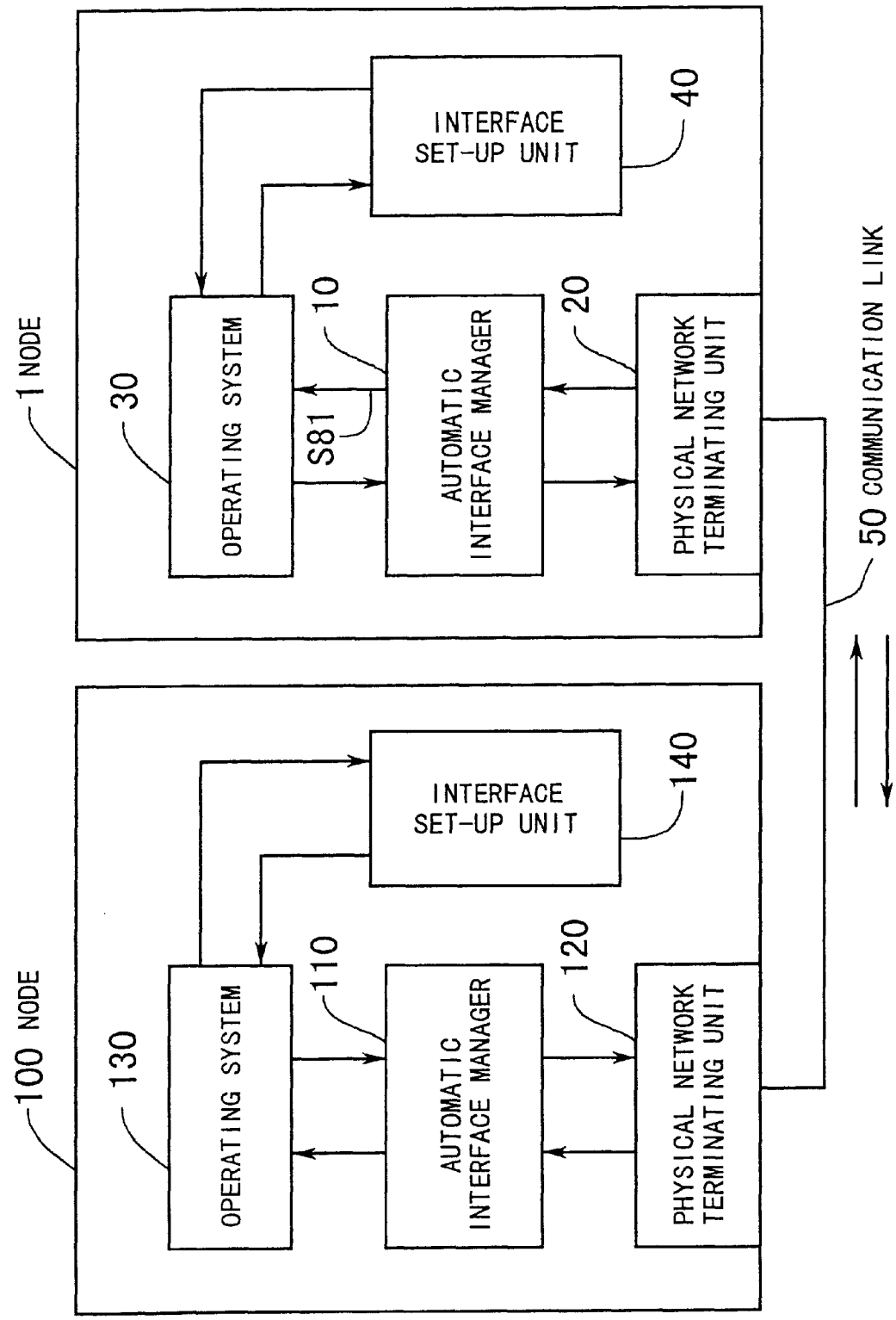
FIG. 11 is a diagram which shows a point-to-point path releasing process when the intended peer node is not registered in a point-to-point interface destination storage unit.

If the controller 16 is unable to find a record of the node 100 in the point-to-point interface destination storage unit 18, the process proceeds to step S81 of FIG. 11. Referring to FIG. 11, the controller 16 notifies the operating system 30 that there is no registered record relevant to the point-to-point interface of interest (Step S81), and accordingly, it terminates the present point-to-point path releasing process.

Referring back to FIG. 9, if a relevant record is found in the point-to-point interface destination storage unit 18, the controller 16 sends a query to the VC origination/disconnection unit 14 as to whether the node 1 has a virtual channel that reaches the peer node 100.

Figure 12:
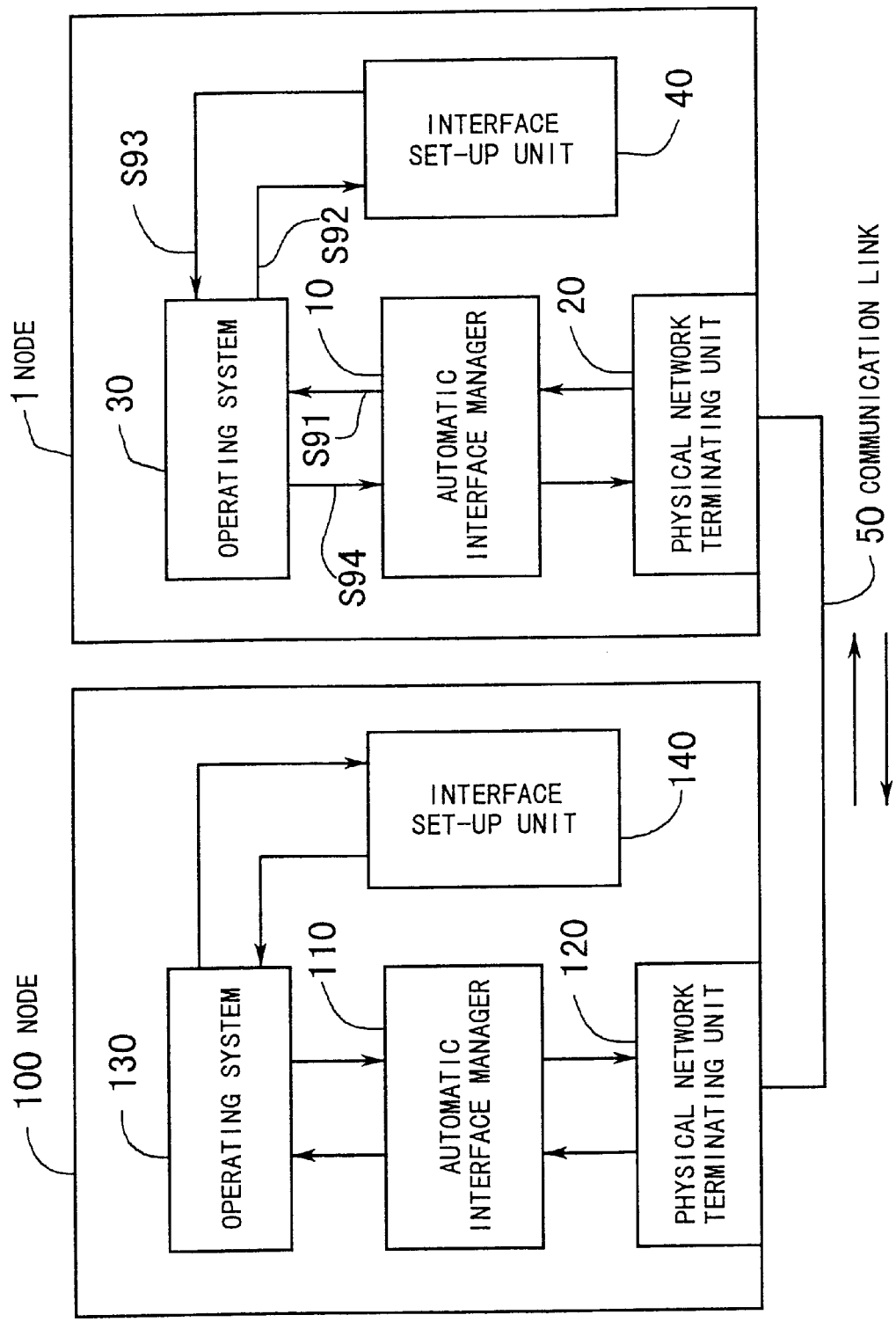
FIG. 12 is a diagram which shows a point-to-point path releasing process when no relevant virtual channels VC are found in a VC origination/disconnection unit.

When the VC origination/disconnection unit 14 cannot find a relevant virtual channel in its virtual channel directory, the present process proceeds to step S91 of FIG. 12. At the node 1, the controller 16 in the automatic interface manager 10 notifies the operating system 30 of the absence of a relevant virtual channel. The controller 16 also requests the operating system 30 to release the existing point-to-point interface to the node 100 (Step S91). The operating system 30 passes this request to the interface set-up unit 40 (Step S92). The interface set-up unit 40 cancels the existing point-to-point interface to the node 100 by removing the initial setup for a relevant task which was once made by the point-to-point communications software program. The interface set-up unit 40 also removes the existing association between the point-to-point interface and its corresponding virtual channel. After that, the interface set-up unit 40 notifies the operating system 30 of the completion of the above steps (Step S93). The operating system 30 forwards this completion notification to the automatic interface manager 10 (Step S94). In response to this notification, the controller 16 in the automatic interface manager 10 removes the record pertaining to the cancelled point-to-point interface from the point-to-point interface destination storage unit 18, thus terminating the point-to-point path releasing process.

Referring back to FIG. 9, when the VC origination/disconnection unit 14 finds a relevant virtual channel, the present point-to-point path releasing process executes step S62. That is, the controller 16 in the automatic interface manager 10 commands the point-to-point path management packet generator 15 to produce and send a packet containing a release request message that requests the node 100 to release the point-to-point interface between the nodes 1 and 100. This packet is passed to the physical network terminating unit 20 through the packet/cell converter 12 and cell transmitter/receiver 11 (Step S62). The packet is then transmitted to the node 100 (Step S63).

At the node 1, the physical network terminating unit 120 receives the above point-to-point interface release request message and supplies it to the automatic interface manager 110 (Step S64). In the automatic interface manager 110, the message reaches the packet discrimination unit 13 via the cell transmitter/receiver 11 and packet/cell converter 12. The packet discrimination unit 13 forwards the message to the controller 16 to check whether the destination address of the message coincides with the address of the node 100 itself.

Figure 13:
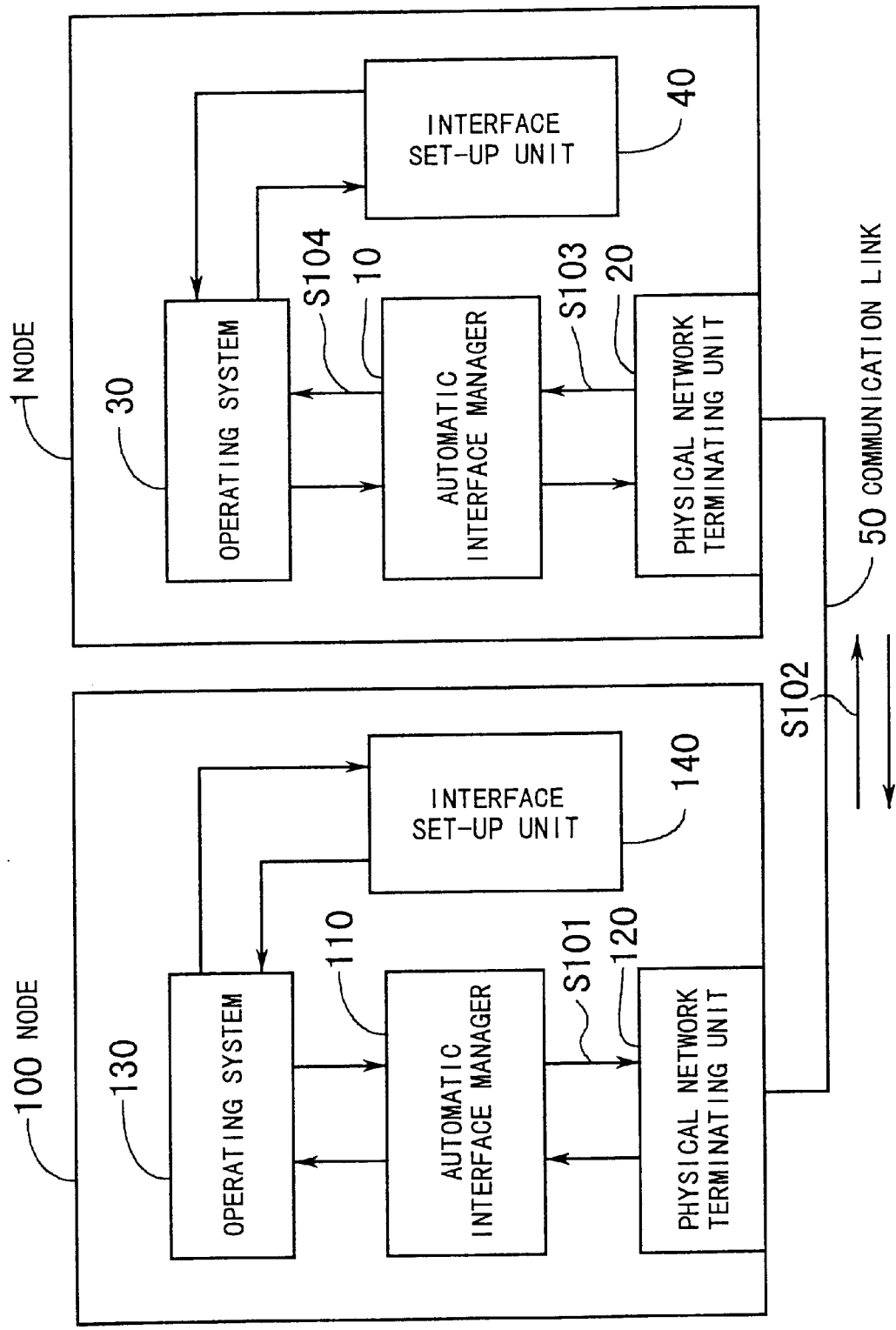
FIG. 13 is a diagram which shows a point-to-point path releasing process when a node has received an irrelevant point-to-point interface release request message whose destination address does not coincide with the address of the node.

If it turns out that the destination address of the request message does not agree with the node 100's address, then the present process branches off to step S101 of FIG. 13. In FIG. 13, the controller 16 in the automatic interface manager 110 directs the point-to-point path management packet generator 15 to produce a packet containing a response message indicating a destination address error. The produced response message is passed to the physical network terminating unit 120 through the packet/cell converter 12 and cell transmitter/receiver 11 in the automatic interface manager 110 (Step S101). The physical network terminating unit 120 transmits the response message to the node 1 over the communication link 50 (Step S102).

At the node 1, the received response message is supplied from the physical network terminating unit 20 to the automatic interface manager 10 (Step S103). In the automatic interface manager 10, the received response message reaches the packet discrimination unit 13 via the cell transmitter/receiver 11 and packet/cell converter 12. The packet discrimination unit 13 forwards the message to the controller 16. The controller 16 notifies the operating system 30 of the destination address error (Step S104) and terminates the point-to-point path releasing process.

Referring back to FIG. 9, when the destination address of the release request message agrees with the node 100's address, the controller 16 in the automatic interface manager 110 commands the operating system 130 to release the existing point-to-point interface between the nodes 1 and 100 (Step S65).

The operating system 130 informs the interface set-up unit 140 of this command (Step S66). As a result, the interface set-up unit 140 cancels the existing point-to-point interface to the node 100 by removing the initial setup of a relevant task that has been made by the point-to-point communications software program. It also removes the existing association between the point-to-point interface and its corresponding virtual channel. After that, the interface set-up unit 140 sends a report to the operating system 130 as to whether the above process has successfully finished or not (Step S67). The operating system 130 then transmits the report message to the automatic interface manager 110 (Step S68).

Figure 14:
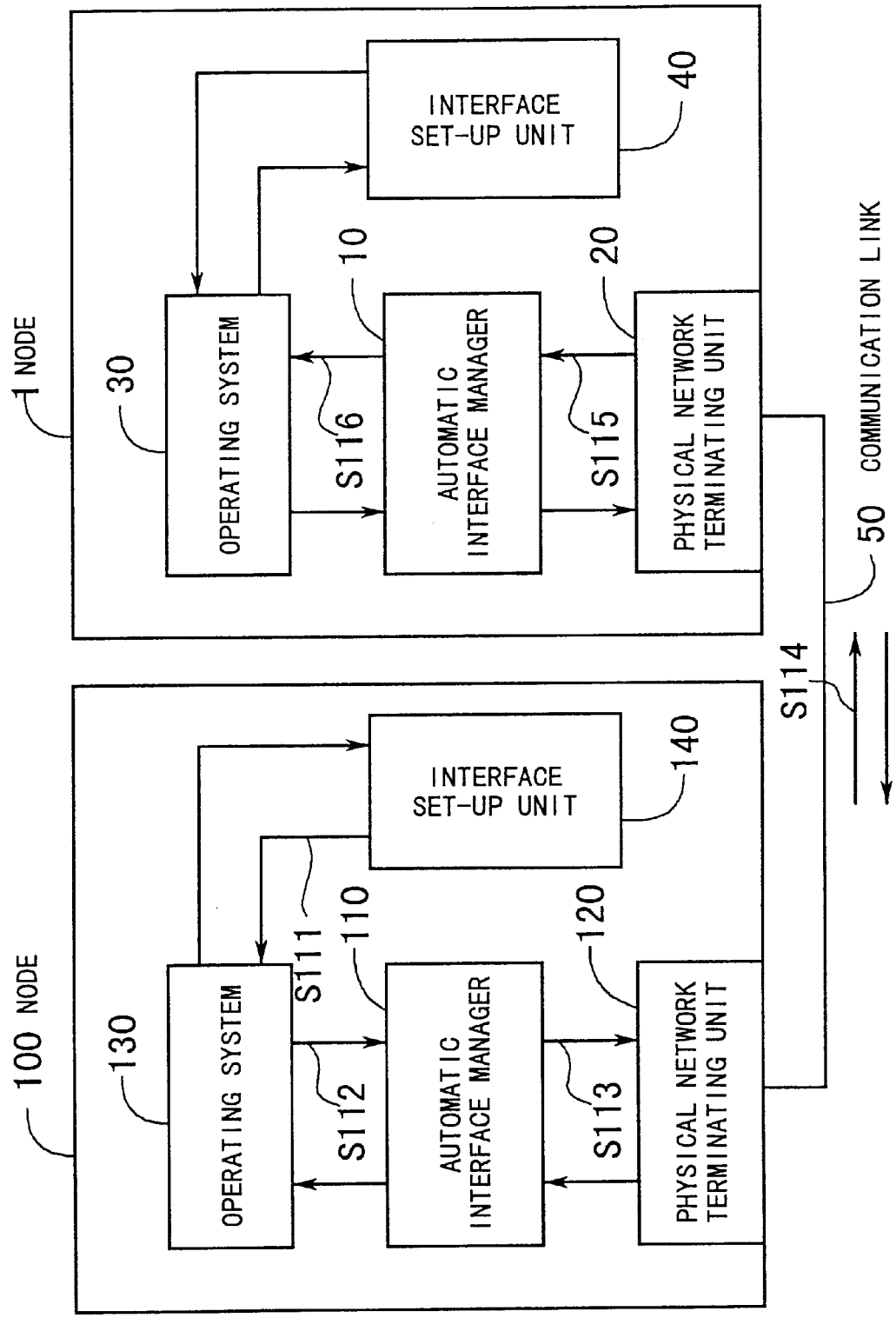
FIG. 14 is a diagram which shows a point-to-point path releasing process when a series of deletion processes have not successfully completed.

When the interface set-up unit 140 has failed to cancel the specified point-to-point interface and its associated data, the present process advances to step S111 in FIG. 14. Referring now to FIG. 14, the interface set-up unit 140 informs the operating system 130 of the unsuccessful result (Step Sill). The operating system 130 then transmits the information to the automatic interface manager 110 (Step S112). Upon receipt of this notification, the controller 16 in the automatic interface manager 110 directs the point-to-point path management packet generator 15 to produce a packet containing a response message that indicates the unsuccessful result of the point-to-point interface releasing process. This response message is passed to the physical network terminating unit 120 through the packet/cell converter 12 and cell transmitter/receiver 11 in the automatic interface manager 110 (Step S113). The physical network terminating unit 120 transmits the response message to the node 1 over the communication link 50 (Step S114).

At the node 1, the received response message is supplied from the physical network terminating unit 20 to the automatic interface manager 10 (Step S115). In the automatic interface manager 10, the message reaches the packet discrimination unit 13 via the cell transmitter/receiver 11 and packet/cell converter 12. The packet discrimination unit 13 forwards the message to the controller 16. The controller 16 notifies the operating system 30 of a failure in the present point-to-point path releasing process (Step S116). The process is terminated accordingly.

Referring back to FIG. 9, when the above path removal process is successfully finished at the peer node 100, the controller 16 in the automatic interface manager 110 informs the operating system 130 of the successful result. The controller 16 updates the point-to-point interface destination storage unit 18 by removing a registered record relevant to the point-to-point interface to the node 1 that has just been deleted. The controller 16 then directs the point-to-point path management packet generator 15 to produce a packet containing a response message that indicates the successful result of point-to-point interface releasing. The produced response message is passed to the physical network terminating unit 120 through the packet/cell converter 12 and cell transmitter/receiver 11 in the automatic interface manager 110 (Step S69). The physical network terminating unit 120 transmits the response message to the node 1 over the communication link 50 (Step S70).

Referring now to FIG. 10, the transmitted response message arrives at the physical network terminating unit 20 of the node 1. The message is then supplied to the automatic interface manager 10 (Step S71). In the automatic interface manager 10, the message reaches the packet discrimination unit 13 via the cell transmitter/receiver 11 and packet/cell converter 12. The packet discrimination unit 13 forwards the message to the controller 16. The controller 16 commands the operating system 30 to release the existing point-to-point interface between the nodes 1 and 100 (Step S72). The operating system 30 passes this command to the interface set-up unit 40 (Step S73). The interface set-up unit 40 cancels the existing point-to-point interface to the node 100 by deleting the initial setup for a relevant task which has been made by the point-to-point communications software program. It also removes the existing association between the point-to-point interface and its corresponding virtual channel. After that, the interface set-up unit 40 informs the operating system 30 of the completion of the above process (Step S74). The operating system 30 transmits this completion notification to the automatic interface manager 10 (Step S75). In response to the completion notification, the controller 16 in the automatic interface manager 10 commands the VC origination/disconnection unit 14 to disconnect the existing virtual channel between the nodes 1 and 100. When a disconnection completion message is received from the VC origination/disconnection unit 14, the controller 16 deletes a record pertaining to the cancelled point-to-point interface from the point-to-point interface destination storage unit 18, thus terminating the point-to-point path releasing process.

In this way, the existing point-to-point interface is released at both nodes 1 and 100, and at the same time, its associated virtual channel is disconnected. This means that the point-to-point path between the nodes 1 and 100 has been completely released.

Aside from the above-described point-to-point path releasing process, the point-to-point communication interface management system of the present invention has a feature of removing inactive interfaces. More specifically, each node has a timer 19 which generates an interrupt to the controller 16 at regular intervals. In response to each interrupt signal, the controller 16 makes access to the point-to-point interface destination storage unit 18 to scan the last-access time records, which indicate the time of last access to each point-to-point interface. Here, the controller 16 compares each time record with the present time of day, in order to find a particular record showing that a predetermined time has elapsed since the last access to the corresponding point-to-point interface. If such a time record is found, the controller 16 deems that particular point-to-point interface obsolete, thus removing its entry from the directory. This feature reduces memory consumption relating to the point-to-point interface management.

The above discussion is summarized as follows. The present invention gives flexibility to the association between connection-oriented communication interfaces and virtual channels in the connection-oriented communication interface management system which defines and uses them in a connection-oriented, multiplexed communications network. That is, the present invention permits the connection-oriented communication interfaces to be dynamically configured by: (1) setting up a connection-oriented communication interface, besides establishing a virtual channel to reach a peer node separately, and (2) associating the connection-oriented communication interface with the virtual channel established. This feature gives flexibility to network system design, enabling an advanced communications network to be constructed, fully exploiting excellent characteristics of ATM technologies.

In addition, the present invention allows virtual channels to be handled separately from connection-oriented communication interfaces. Even if there arises a problem with the ATM network that causes disconnection of a virtual channel, it would not lead to disruption of a communication interface associated with the virtual channel. Rather, the present invention permits the connection-oriented communication interface to be redefined by newly associating it with another virtual channel.

Further, the interface management system of the present invention releases connection-oriented communication interfaces that have been inactive for a predetermined period. This feature enables dynamic releasing of connection-oriented communication interfaces, thus reducing the consumption of memory resources.

In the present invention, connection-oriented communication interfaces can be established only for a prescribed group of peer nodes, which limits the bounds of possible IP connections through connection-oriented communication interfaces. In the case of router nodes, this feature makes it possible to reduce the amount of routing table entries.

According to the present invention, destination nodes of established connection-oriented communication interfaces are recorded in a directory. This feature avoids needless duplication of connection-oriented communication interfaces for the same peer node.

The proposed system uses some special packets to control the process of establishing and removing connection-oriented communication interfaces. When a packet arrived at a node has an irrelevant destination address, the node will discard the packet. This feature prevents router nodes from delivering unnecessary packets to their local terminal stations.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A connection-oriented communication interface management system disposed in a node which communicates with peer nodes by using multiplexed communications techniques, comprising:

virtual channel set-up means for establishing a virtual channel to a peer node;

interface set-up means for establishing a connection-oriented communication interface to reach the peer node and associating the connection-oriented communication interface with the virtual channel established by said virtual channel set-up means;

storage means for storing a directory of peer nodes for which the connection-oriented communication interfaces established by said interface set-up means are destined;

testing means, responsive to a request message from the peer node that requests establishment of a connection-oriented communication interface, for testing whether the peer node is not registered in the directory stored in said storage means; and means for establishing the requested connection-oriented communication interface to reach the peer node when said testing means finds that the peer node is not registered in the directory, and returning a response message to notify the peer node of result status of said establishment of the requested connection-oriented communication interface.

2. The connection-oriented communication interface management system according to claim 1, wherein said interface set-up means establishes the connection-oriented communication interface by initializing a connection-oriented communication software program for each node, independently of any virtual channels.

3. The connection-oriented communication interface management system according to claim 1, further comprising releasing means for releasing the association between the connection-oriented communication interface and the virtual channel, when the virtual channel is disconnected.

4. The connection-oriented communication interface management system according to claim 1, further comprising transmission means for transmitting a request message to request the peer node to set up a connection-oriented communication interface.

5. The connection-oriented communication interface management system according to claim 4, wherein said interface set-up means comprises means, responsive to a request message from the peer node that requests establishment of a connection-oriented communication interface, for establishing the requested connection-oriented communication interface to reach the peer node, and returning a response message to notify the peer node of result status of said establishment of the requested connection-oriented communication interface.

6. The connection-oriented communication interface management system according to claim 4, wherein said interface set-up means comprises:

testing means, responsive to a request message from the peer node that requests establishment of a connection-oriented communication interface, for testing whether the peer node is eligible for the establishment of the requested connection-oriented communication interface; and means for establishing the requested connection-oriented communication interface to reach the peer node when said testing means has granted the peer node to be eligible, and returning a response message to notify the peer node of result status of said establishment of the requested connection-oriented communication interface.

7. The connection-oriented communication interface management system according to claim 1, further comprising:

set-up request transmission means for transmitting a set-up request message to the peer node in order to request the peer node to establish a connection-oriented communication interface;

release request transmission means for transmitting a release request message to the peer node in order to request the peer node to release the connection-oriented communication interface being established; and discarding means, responsive to a set-up request message or a release request message received from the peer node, for discarding the received message if the received message turns out to be irrelevant to the node itself.

8. The connection-oriented communication interface management system according to claim 1, further comprising releasing means for releasing the connection-oriented communication interface once established by said interface set-up means, when the connection-oriented communication interface has been inactive for a predetermined period.

* * * * *